United States Patent
Perdios et al.

(10) Patent No.: US 11,846,608 B2
(45) Date of Patent: Dec. 19, 2023

(54) IMAGE RECONSTRUCTION METHOD BASED ON A TRAINED NON-LINEAR MAPPING

(71) Applicant: ECOLE POLYTECHNIQUE FEDERALE DE LAUSANNE (EPFL), Lausanne (CH)

(72) Inventors: Dimitris Perdios, Lausanne (CH); Adrien Besson, Marseilles (FR); Florian Martinez, Chavannes-près-Renens (CH); Marcel Arditi, Aïre (CH); Jean-Philippe Thiran, Granges (CH)

(73) Assignee: ECOLE POLYTECHNIQUE FEDERALE DE LAUSANNE (EPFL), Lausanne (CH)

(*) Notice: Subject to any disclaimer, the term of this patent is extended or adjusted under 35 U.S.C. 154(b) by 434 days.

(21) Appl. No.: 17/283,380

(22) PCT Filed: Aug. 29, 2019

(86) PCT No.: PCT/EP2019/073152
§ 371 (c)(1),
(2) Date: Apr. 7, 2021

(87) PCT Pub. No.: WO2020/074181
PCT Pub. Date: Apr. 16, 2020

(65) Prior Publication Data
US 2021/0341436 A1   Nov. 4, 2021

(30) Foreign Application Priority Data
Oct. 8, 2018 (EP) .................................. 18199166

(51) Int. Cl.
G01N 29/44 (2006.01)
G01N 29/04 (2006.01)
(Continued)

(52) U.S. Cl.
CPC ....... *G01N 29/4481* (2013.01); *G01N 29/043* (2013.01); *G01N 29/0654* (2013.01);
(Continued)

(58) Field of Classification Search
CPC .. G01N 29/043; G01N 29/4481; G01N 29/11; G01N 29/0654; G01N 29/32;
(Continued)

(56) References Cited

U.S. PATENT DOCUMENTS

2010/0165348 A1* 7/2010 Fleischer ................ G02F 1/353
703/2
2013/0009641 A1* 1/2013 Hori .................. G01R 33/56572
324/309
(Continued)

FOREIGN PATENT DOCUMENTS

CN     107369189 A    11/2017

OTHER PUBLICATIONS

Clarke F., "Functional Analysis, Calculus of Variations and Optimal Control," Graduate Texts in Mathematics, vol. 264.
(Continued)

*Primary Examiner* — Congvan Tran
(74) *Attorney, Agent, or Firm* — Maschoff Brennan

(57) ABSTRACT

The present invention concerns an array processing image reconstruction method comprising: receiving a set of echo waveforms as measurements from the object of interest; defining a measurement model linking an unknown image of the object to the measurements; defining a data fidelity functional using the measurement model; defining a regularisation functional using a trained non-linear mapping, the regularisation functional comprising prior knowledge about the unknown image; defining an optimisation problem involving the data fidelity functional and the regularisation functional for obtaining a first image estimate of the
(Continued)

unknown image; and solving the optimisation problem to obtain the first image estimate.

15 Claims, 5 Drawing Sheets

(51) Int. Cl.
*G01N 29/06* (2006.01)
*G01N 29/11* (2006.01)
*G01S 7/52* (2006.01)
*G01S 15/89* (2006.01)
*G06T 11/00* (2006.01)

(52) U.S. Cl.
CPC .......... *G01N 29/11* (2013.01); *G01S 7/52046* (2013.01); *G01S 7/52077* (2013.01); *G01S 15/8977* (2013.01); *G06T 11/005* (2013.01); *G01N 2291/023* (2013.01); *G01N 2291/106* (2013.01); *G06T 2211/424* (2013.01)

(58) Field of Classification Search
CPC ....... G01N 2291/023; G01N 2291/044; G01N 2291/106; G01S 15/8977; G01S 7/52077; G01S 7/52046; G06N 3/084; G06T 11/006; G06T 11/005; G06T 2211/424
See application file for complete search history.

(56) References Cited

U.S. PATENT DOCUMENTS

| | | | | |
|---|---|---|---|---|
| 2014/0125333 | A1* | 5/2014 | Hanada | G01R 33/56572 324/318 |
| 2014/0321713 | A1* | 10/2014 | Sava | G01V 1/303 382/109 |
| 2020/0225335 | A1* | 7/2020 | Besson | G01S 7/52085 |

OTHER PUBLICATIONS

Venkatakrishnan, et al., "Plug-and-Play priors for model based reconstruction", IEEE Global Conference on Signal and Information Processing, 2013, pp. 945-994.
Kingma, et al., "Adam: A Method for Stochastic Optimization," pp. 1-15 (2014).
Ronneberger, et al., "U-Net: Convolutional Networks for Biomedical Image Segmentation," pp. 1-8 (2015).
Eunhee Kang, et al., "A deep convolutional neural network using directional wavelets for low-dose X-ray CT reconstruction," Medical Physics, vol. 44, Issue 10, pp. e360-e375 (Oct. 1, 2017).
Martin Benning, et al., "Modern Regularization Methods for Inverse Problems," arxiv.org, Cornell University Library, pp. 1-2 (Jan. 30, 2018).
European Search Report dated Mar. 13, 2019 as received in Application No. 18199166.2.

* cited by examiner

IMAGE RECONSTRUCTION METHOD BASED ON A TRAINED NON-LINEAR MAPPING

TECHNICAL FIELD

The present invention relates to an image reconstruction method. More specifically, the method uses a trained non-linear mapping to reconstruct an image. The method may be used for example in ultrasound imaging. The invention also relates to a corresponding imaging apparatus and to a computer program product for implementing the method.

BACKGROUND OF THE INVENTION

Array processing techniques, such as used in radar, sonar, seismic imaging and ultrasound (US) imaging, are widely used in various technical fields. In medical applications, US imaging is used to see internal body structures such as tendons, muscles, joints, vessels and internal organs. However, US imaging is also widely used outside the medical field. One commercial use of US imaging is non-destructive testing (NDT), which is a process of inspecting, testing, or evaluating materials, components or assemblies for discontinuities, or differences in characteristics without destroying the serviceability of the part or system. In other words, when the inspection or test is completed, the part can still be used. An example of an NDT would be US testing of oil pipes. In this case, ultrasound pulse waves, for instance, are used to propagate within the pipe, and in this manner, it is possible to detect if there is a crack or defect from reflections of the pulse waves. With a knowledge of the speed of the acoustic wave in the pipe and the time interval between the reflection from the crack and sending the pulse waves, the position of the defect can be estimated. The same theory used for crack detection in pipes can be used to detect cracks in aircraft structures/wing panels etc. and to detect the build-up of ice on the surface of the wing for example.

Thanks to its high flexibility, cost efficiency, safety and non-invasiveness, US imaging is a widely used imaging modality. Pulse-echo US imaging is traditionally performed using an array of transducer elements, also referred to as transducers or transducer-arrays, and capable of converting electrical signals to acoustic pressure waves and vice versa. Such an array of elements is used to transmit short acoustic wavefronts propagating through the medium of interest. The backscattered echoes, which arise from local variations in acoustic impedance, are then received by the same array and detected as so-called raw element radio frequency (RF) data. RF images are typically reconstructed in real time from these measurements using the popular delay-and-sum (DAS) algorithm. B-mode images, obtained by applying envelope detection and log-compression to the RF images, are commonly used for display and storage purposes.

Recently, so-called ultrafast US imaging has drawn a lot of interest in the research community. Compared to conventional US imaging, where multiple pulse-echo measurements are taken using focused transmit beams, ultrafast US imaging exploits the idea of insonifying the entire field-of-view at once by transmitting unfocused wavefronts, such as a plane wave (PW) or a diverging wave (DW). This may lead to extremely high frame rates of multiple kHz, limited only by the round-trip time-of-flight of the unfocused wavefront and its resulting backscattered echoes, and the image-reconstruction time. Such frame rates opened up US imaging to a broad new range of diagnostic modalities, such as elastography, ultrafast vector flow imaging, and functional US imaging. The main drawbacks of ultrafast US imaging are a lower signal-to-noise ratio (SNR) and degraded image quality, compared to using sequential focused beams. Indeed, compared to a focused transmit beam where the energy is concentrated in a specific region of interest, the energy of an unfocused wavefront is spread over the whole field-of-view.

A common way to increase the overall quality consists in averaging multiple images, reconstructed from different insonification directions, in a process called coherent compounding, which is, in some sense, similar to reconstructing an image from multiple projections as in computed tomography (CT). While the implementation of such a technique is straightforward, it inevitably comes at the cost of lower frame rates, larger data transfers and increased computational requirements since multiple transmit-receive events and image reconstruction processes are required.

The problem of reconstructing high-quality images in the context of ultrafast US imaging has raised an important interest in the US imaging community. Recent approaches try to minimise the necessary number of unfocused transmitted wavefronts to reconstruct high-quality images. While some of the existing approaches achieve high-quality images with few transmit-receive events, they suffer from an important computational complexity, preventing their use in real time applications.

To summarise, currently known array processing image reconstruction methods suffer from suboptimal compromises: they may provide high-quality images at a reduced rate, or low-quality images at a very fast rate.

SUMMARY OF THE INVENTION

It is an object of the present invention to overcome at least some of the problems identified above related to reconstructing images in the field of array processing.

According to a first aspect of the invention, there is provided an image reconstruction method as recited in claim 1.

The proposed new solution has the advantage that images can be reconstructed very fast and they have a very high quality.

The present invention thus proposes an image reconstruction method, which may be formulated as an inverse problem, by solving an optimisation problem using a highly effective data-driven prior. Such a prior is constructed using a non-linear mapping, such as an artificial neural network (ANN), trained specifically for the purpose of the imaging task. Depending on the properties of the data-driven prior, it may be used in an iterative algorithm, such as gradient descent, plug-and-play prior or projected gradient descent. It is proposed to train a non-linear mapping from low-quality images, e.g. reconstructed from a single PW or DW, to high-quality images free of any artefacts, e.g. reconstructed from synthetic aperture (SA) measurements, considered then as a reference or gold-standard method. In contrast to some existing solutions, the present approach focuses on reconstructing high-quality RF images and speckle patterns, preserving their spectral content. The proposed solution in one aspect relies on neural networks (NNs) since they have proved to be extremely efficient and robust in similar tasks. By properly training a NN to map low-quality to high-quality images, highly specific prior knowledge about the general structure of high-quality images can be obtained. Furthermore, the computational requirements for achieving such a mapping can be compatible with real-time imaging.

According to a second aspect of the invention, there is provided an imaging apparatus configured to carry out the method according to the first aspect of the invention as recited in claim 15.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF AN EMBODIMENT OF THE INVENTION

Figure 1:
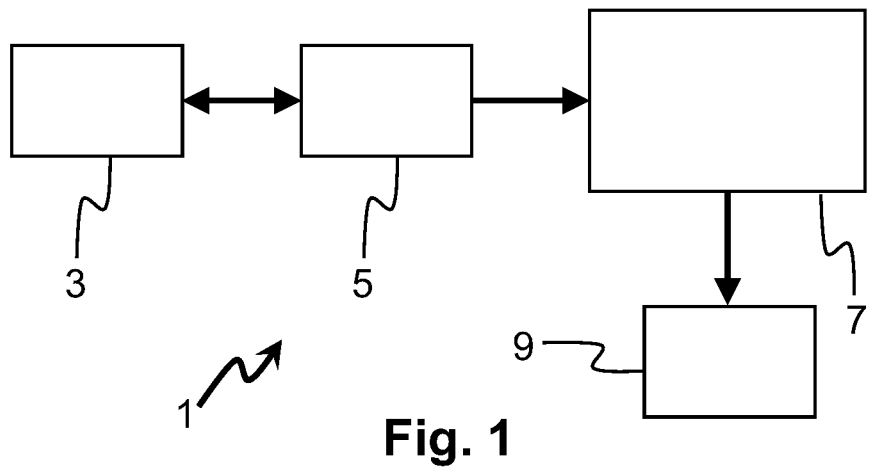
FIG. 1 is a block diagram illustrating some elements of an imaging system, which are useful for understanding the teachings of the present invention, according to an example of the present invention.

An embodiment of the present invention will now be described in detail with reference to the attached figures. This embodiment is described in the context of pulse-echo US imaging, but the teachings of the invention are not limited to this environment. Identical or corresponding functional and structural elements which appear in the different drawings are assigned the same reference numerals. In the present description, vector variables and functions outputting a vector are denoted with a bold font.

FIG. 1 is a simplified block diagram showing some elements of the imaging system or apparatus 1, which are useful for understanding the teachings of the present invention. The proposed imaging system, as shown in FIG. 1 comprises a US probe 3 capable by means of a transmit and receive module 3 to transmit an acoustic beam in a medium of interest and receive backscattered echoes. The images are reconstructed using the image reconstruction module 7 which takes advantage of a trained non-linear mapping or trained non-linear function used in conjunction with an image reconstruction algorithm or process carried out by the image reconstruction module 7. The trained non-linear mapping is non-linear with respect to its input data (in this example images) and is arranged to map an input vector space to an output vector space. A post-processing and display module 9 is arranged to post-process the reconstructed image. The main advantage of the proposed image reconstruction method is its capability of reconstructing high-quality images, free of common array processing artefacts, with a number of transmit-receive events dramatically reduced compared to the number of transmit-receive events required to obtain a similar image quality with state-of-the-art image reconstruction methods.

The US probe 3 in this example has a finite aperture comprising a linear array of piezoelectric elements, also referred to as transducers. Such a probe is suitable for the purpose of imaging in 2D, and may include a cylindrical focusing scheme to concentrate the acoustic energy, in elevation, in the vicinity of the image plane. However, this kind of probe is merely an example. The proposed method could be easily adapted to different probe geometries (such as convex probes, phased arrays etc.) or technologies (including polyvinylidene fluoride (PVDF) copolymers and capacitive micromachined ultrasonic transducers (CMUT) etc.). Similarly, the proposed method can be extended to cases using 2D matrix probes, designed to transmit acoustic beams and collect echoes from the insonified volume in order to provide volumetric imaging, whereby the imaging process produces a 3D representation of the volume under scrutiny. In 2D imaging configurations, probes with transducer elements arranged along a straight planar, convex or concave line are conventionally used. In 3D imaging configurations, matrix-array probes with transducer elements arranged on a planar, convex or concave surface are conventionally used. These transducers elements are capable of converting electrical excitation into acoustic pressure waveforms and record acoustic pressure waveforms into electrical signals. This property is used for both transmitting acoustic beams in the medium of interest and receiving the corresponding backscattered echoes, which arise from local acoustic impedance variations. The probe 3 thus forms an array processing configuration having an array structure comprising a set of transducers, which can act as sensors or actuators, that are spatially separated.

The transmit and receive module 5 in this example comprises a transmit path and a receive path and is connected to the US probe 3. The transmit path generally contains frontend electronics, which may include an electrical excitation circuitry with controlled timing, voltage-amplitude and waveform shaping means. It is used for controlling and shaping the desired transmit beams. The receive path generally contains electrical circuitry with associated programmable gain controls (such as fixed gain and time-gain compensation) for counteracting the object (e.g. tissue) attenuation, and analogue-to-digital conversion means followed by digital signal processing means. The received signals or measurements are then sent to the image reconstruction module 7.

The objective of the image reconstruction module 7 is to reconstruct an image of the medium under scrutiny from the received signals. To this end, the image reconstruction module 7 implements an image reconstruction method, process or algorithm, which uses a trained non-linear mapping defined as $f_\theta$. The trained non-linear mapping may be an ANN whose trainable parameters θ have been optimised to reduce or even remove common US imaging artefacts. In other words, the non-linear mapping may be a machine learning configuration having trainable parameters. The training of these trainable parameters is carried out by using optimisation algorithms using a dedicated dataset. Once trained, the trained non-linear mapping is used in the image reconstruction method to produce high-quality images with a minimal number of transmit-receive events.

The image reconstruction method solves an ill-posed inverse problem of the form $$y = H(x) + n, \quad (1)$$

where $x \in \mathbb{R}^N$ ($\mathbb{R}$ denoting real numbers) is the unknown image with N being the number of image elements, i.e. pixels or voxels composing the image, $y \in \mathbb{R}^M$ are the measurements with M being the number of measurement samples, $H: \mathbb{R}^N \to \mathbb{R}^M$ is the measurement model, which accounts for the physical measurement process (which in the case of US may take advantage of a relation between time-of-arrival and distance travelled by the waveform, as determined by the speed-of-sound in the medium), and $n \in \mathbb{R}^M$ is the measurement noise. Finding the unknown image x or its estimate $\hat{x}$ can be performed using an iterative algorithm to solve an optimisation problem of the form:

$$\hat{x} = \underset{x \in R^N}{\operatorname{argmin}} \{\mathcal{D}(x) + \lambda \mathcal{R}(x)\}, \quad (2)$$

where $\mathcal{D}: \mathbb{R}^N \to \mathbb{R}^+$ is the data fidelity functional or term (also known as a data discrepancy functional), $\mathcal{R}: \mathbb{R}^N \to \mathbb{R}^+$ ($\mathbb{R}^+$ denoting positive real numbers) is the regularisation functional or term commonly referred to as a prior encoding prior knowledge about the unknown image x, and $\lambda \in \mathbb{R}^+$ is a hyper-parameter controlling the weighting of the regularisation functional with respect to the data fidelity functional. A functional is understood to refer to a (e.g. linear) mapping from a vector space into the real numbers $\mathbb{R}$. Instead of using standard image processing priors, such as sparsity in fixed bases or frames, which are of limited appeal in US imaging, a highly efficient and representative data-driven regularisation functional $\mathcal{R}$ can be constructed using a trained non-linear mapping $f_\theta$. Many well-known iterative algorithms are available in the literature to solve the problem of Equation (2), such as gradient descent, proximal gradient descent and projected gradient descent, depending on the mathematical properties of both functionals $\mathcal{D}$ and $\mathcal{R}$. Such algorithms may benefit from the differentiability of the regularisation functional $\mathcal{R}$, which implies the non-linear mapping $f_\theta$ to be differentiable. In such a setting, the use of a trained NN as the non-linear mapping $f_\theta$ may be beneficial since they can be built differentiable or can exploit standard techniques to accurately approximate their derivative. Moreover, efficient evaluation of their derivative can be readily exploited to speed up the computations involved in each iteration of the algorithm.

Figure 2:
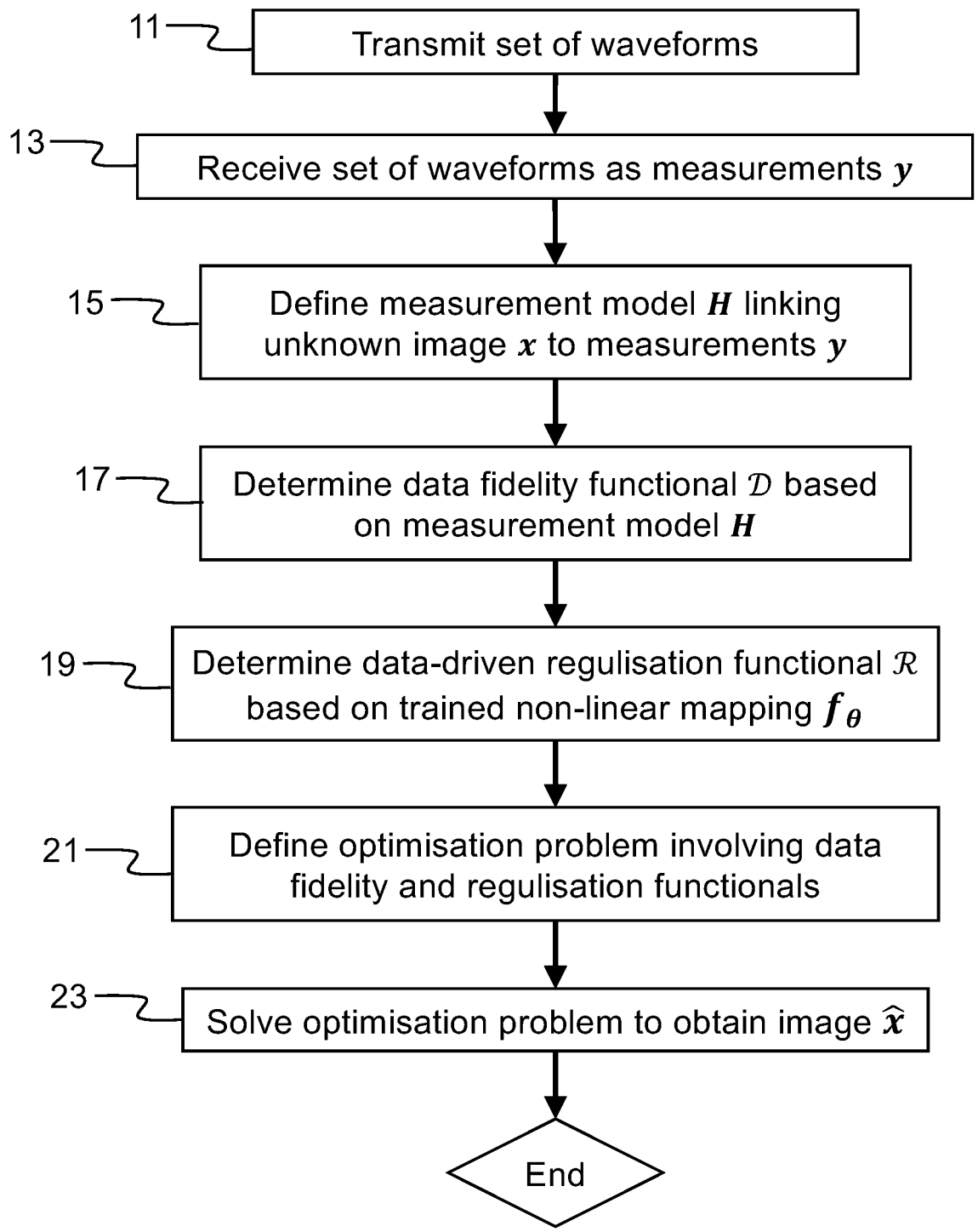
FIG. 2 is a flow chart illustrating the proposed image reconstruction method according to an example of the present invention.

The flow chart of FIG. 2 summarises the proposed image reconstruction method according to an example. In step 11, the probe 3 transmits by using a set of transmitting elements a set of waveforms in a medium to be reconstructed at least partially. However, it is to be noted that step 11 is optional since the object of interest could simply be exposed to a physical excitation, which may include US (acoustic waveforms), thermal, or other excitations, such as electromagnetic-radiation pulses in photoacoustic imaging. In step 13, the probe 3 or more specifically its sensor(s) receives or acquires by using a set of receiving elements a set of (echo) waveforms arising from the physical scattering of the insonified medium. In other words, in this step a set of waveforms (or signals) is received or acquired as measurements from the object of interest stimulated by (or exposed to) a physical excitation. In step 15, a measurement model is defined, determined or identified linking the unknown image of the medium to the recorded set of measurements. In step 17, a data fidelity functional $\mathcal{D}$ is constructed, determined or identified using the defined measurement model as will be explained later. In step 19, a data-driven regularisation functional $\mathcal{R}$ or prior is constructed, determined or identified using a trained non-linear mapping $f_\theta$ as will be explained later. In step 21, an optimisation problem involving the data fidelity functional $\mathcal{D}$ and the regularisation functional $\mathcal{R}$ is defined, determined or identified for obtaining a meaningful or high-quality estimate $\hat{x}$ of the unknown image. In step 23, the optimisation problem is solved for instance by means of an iterative algorithm or solver until a convergence criterion is reached to obtain the image estimate $\hat{x}$ of the medium under scrutiny. The algorithm may comprise between 10 and 100 iterations or more specifically between 10 and 50 iterations or between 1 and 20 iterations. The steps 15 to 21 may be carried out by the image reconstruction module 7.

After image reconstruction, the reconstructed data (i.e. an image) are sent to a post-processing and display module 9 as further shown in FIG. 1. The post-processing step covers a range of applications, such as:
  B-mode imaging;
  scan conversion;
  colour Doppler imaging;
  vector flow imaging; and
  elastography.

For B-mode imaging using RF data, envelope detection is applied onto the reconstructed data (i.e. the image). The envelope detection can, for instance, be achieved by means of the Hilbert transform followed by a magnitude detection and optional low-pass filtering. It can also be achieved by squaring and low-pass filtering the signal. In the case of B-mode imaging using IQ data, the magnitude of the complex signal is extracted. The envelope detection step is followed by a gain adjustment and dynamics compression steps. For Doppler and elastography, the reconstructed RF or IQ data (i.e. the image) are used directly, without post-processing.

In the above description, a brief overview of the invention was given. The invention will be next described in more detail with reference to some concrete examples.

US imaging, and more generally array processing, suffers from artefacts due to several factors, some of which are described below. Typical US probes have a finite aperture which is subdivided into an array of transducer elements. Each of these transducer elements has bandlimited, or bandpass, electro-acoustic and acousto-electric impulse responses allowing them to convert electrical excitation into acoustic pressure and record acoustic pressure into an electrical signal. This implies that an ideal point reflector in tissue can only be recorded as a bandlimited, or bandpass, RF pulse waveform. The finite dimension nature of transducer elements makes them diffracting objects with directional sensitivity. The probe aperture, the arrangement of these transducer elements within the aperture, as well as the delays and amplitudes applied for shaping the transmitted beam are governing factors for the array transmit and receive spatial impulse responses (SIRs). The number and type of transmitted beams and corresponding DAS beamforming operations are key factors in the resulting image quality. The probe, the arrangement of transducer elements, their shapes and physical properties together with the transmit and receive settings are defining parameters of a US imaging configuration. Such an imaging configuration is coupled to an image reconstruction method, such as the well-known DAS, to produce an image from the recorded measurements. A standard quality measure of a resulting image is given by the point-spread-function (PSF). Wave propagation effects such as scattering and attenuation also impact the overall image quality. The entire physical imaging process entails the appearance of imaging artefacts, caused most notably by side-lobe and grating-lobe levels, attenuation, reverberation and multiple scattering, which are visualised as reduced contrast, ghost images in incorrect locations, non-physical striped image structures, shadowing, etc.

As an example, let us define two imaging configurations as detailed in Table 1. A low-quality configuration, called LQ, uses a linear probe composed of 128 transducer elements and is centred at 5.133 MHz with 67% bandwidth. Images are reconstructed from a single PW measurement, i.e. all the elements of the array transmit an acoustic wave in the medium at the same time, resulting in an unfocused quasi-plane wavefront. The backscattered echoes are measured by all the elements of the array from which the image is reconstructed by DAS at every pixel location of the image estimate. A high-quality configuration, called HQ, uses a similar probe with twice as many transducer elements within the same aperture. Images are reconstructed from 256 SA measurements, which can be considered as a gold standard in US imaging with a given aperture. SA measurements are obtained as follows. A single element of the array transmits an unfocused wavefront in the medium. The backscattered echoes are measured by all the elements of the array from which pixels of an intermediate RF image are reconstructed by DAS. This procedure is repeated for each element of the array and the final RF image is obtained by averaging all intermediate RF images.

TABLE 1

| Parameter | LQ | HQ |
| --- | --- | --- |
| Element number | 128 | 256 |
| Pitch | 300 µm | 150 µm |
| Element width | 270 µm | 150 µm |
| Aperture | 38.1 mm | 38.1 mm |
| Element height | 5 mm | 5 mm |
| Elevation focus | 20 mm | 20 mm |
| Centre frequency | 5.133 MHz | 5.133 MHz |
| Bandwidth | 67% | 67% |
| Transmit frequency | 5.208 MHz | 5.208 MHz |
| Excitation cycles | 2.5 | 2.5 |
| Sampling frequency | 20.832 MHz | 20.832 MHz |
| Transmit-receive scheme | 1 PW | 256 SA |

By assessing the image reconstruction results, it can be noted that the PSF of the LQ configuration suffers far more from artefacts than the HQ configuration. The side lobes and ghost artefacts, which mostly impact the image contrast, are drastically reduced in the HQ configuration. The main lobe, which has a direct impact on the image resolution, is tightened in the HQ configuration. The grating lobes, which can have devastating blurring and shadowing effects, are present in the LQ configuration. This results from the fact that the considered array-pitch is greater than half the wavelength. These grating lobes are entirely removed in the HQ configuration, which has a half-wavelength pitch. Overall the reconstructed images when using the HQ configuration have a much higher quality than the images reconstructed from the LQ configuration.

Let $W \subset \mathbb{R}^N$ be the subspace of low-quality images reconstructed from an imaging configuration inducing a substantial number of artefacts, where N represents the dimension of an image, such as the number of pixels in two-dimensional (2D) space or the number of voxels in three-dimensional (3D) space. Let $V \subset \mathbb{R}^N$ be the subspace of high-quality images. Such high-quality images may be reconstructed by an optimal US imaging configuration which reduces or even entirely removes these artefacts. It may also be high-quality images acquired with another imaging modality immune to these artefacts or the exact physical medium properties if available. We define the mapping $F:V \to W$ which transforms a high-quality image or a high-quality image estimate (also referred to as a first image estimate) $\hat{x} \in V$ to a corresponding low-quality image or a low-quality image estimate (also referred to as a second image estimate) $\tilde{x} \in W$ such that $$F(\hat{x}) = \tilde{x}. \qquad (3)$$

Many different mappings F may exist, depending the subspaces V and W, but all of them are ill-posed in essence. Indeed, since the level of artefacts present in low-quality images is higher than the level of artefacts present in high-quality images, it implies that F leads to a loss of information. In other words, the mapping F acts as a blurring operator onto the high-quality image $\hat{x}$. Hence, finding the inverse mapping to recover a high-quality image $\hat{x}$ from its corresponding low-quality image $\tilde{x}$ is not possible by means of state-of-the-art methods.

As an example, let us consider the HQ and LQ configurations defined in Table 1. In order to formalise the resulting image subspaces W and V, let us define $Y_L \subset \mathbb{R}^{M_L}$ and $Y_H \subset \mathbb{R}^{M_H}$ as the subspaces of measurements acquired with the LQ and HQ configurations, where $M_L$ and $M_H$ are their corresponding number of measurement samples. In this example, it can be noted that $M_H$ is substantially greater than $M_L$ since the HQ configuration is composed of twice the number of transducer elements and requires 256 times more transmit-receive events than the LQ configuration. Equipped with these definitions, one can express a low-quality image $\tilde{x}$ and a high-quality image $\hat{x}$ as, $$\tilde{x} = D_L(y_L), y_L \in Y_L, \qquad (4)$$

$$\hat{x} = D_H(y_H), y_H \in Y_H, \qquad (5)$$

where $D_L:Y_L \to W$ and $D_H:Y_H \to V$ are the imaging operators for the LQ and HQ configurations, respectively. Hence, the subspace of low-quality images can be expressed as $W = D_L(Y_L)$ and the subspace of high-quality images as $V = D_H(Y_H)$. In the particular example described above, DAS is used as the image reconstruction method, hence both operators $D_L$ and $D_H$ are linear operators. It is interesting to note that the reconstruction method used to reconstruct an image from the set of SA measurements obtained with the HQ configuration is in fact a process which averages coherently multiple views of the same image. Since the images reconstructed with the HQ configuration are obtained with far more views than images reconstructed from the measurements obtained with the LQ configuration, they inherently contain more information. Therefore, it is possible to express the mapping F as defined in Equation (3), which, in this example, is linear, e.g. by means of principal component analysis (PCA). However, it is clear that finding its inverse mapping by means of state-of-the-art methods is not possible since it amounts to recovering lost information.

In order to circumvent this limitation, it is common to formulate an imaging reconstruction task as an inverse problem. Let us define an unknown image $x \in \mathbb{R}^N$ and the measurements $y \in \mathbb{R}^M$ sensed by a US imaging configuration, where M represents the number of measurement samples recorded by the transducer elements of the probe. The corresponding inverse problem can be written as $$y = H(x) + n, \qquad (6)$$

where $H: \mathbb{R}^N \to \mathbb{R}^M$ is the measurement model or forward model (having x as one of its inputs) accounting for the physical measurement process and $n \in \mathbb{R}^M$ is the measurement noise. It is important to note that the measurement model may be non-linear. Even though the proposed formulation is expressed with a measurement model taking values in $\mathbb{R}^N$ (real numbers), it can be readily extended to the case where the measurement model takes values in $\mathbb{C}^N$ (complex numbers). In the special case of a linear inverse problem the measurement model can be expressed as a matrix $H \in \mathbb{R}^{M \times N}$ such that $H(x)=Hx$. In this context, the problem of Equation (6) becomes $$y = Hx + n. \qquad (7)$$

Since the problem of Equation (6) is generally ill-posed, it may be solved by formulating the unconstrained optimisation problem $$\hat{x} = \underset{x \in \mathbb{R}^N}{\arg\min} \{\mathcal{D}(x) + \lambda \mathcal{R}(x)\}. \qquad (8)$$

In the case where both functionals $\mathcal{D}$ and $\mathcal{R}$ are convex, the problem of Equation (8) can be equivalently formulated as the constrained minimisation problem $$\hat{x} = \underset{x \in C_{\mathcal{R}}}{\arg\min} \mathcal{D}(x), \qquad (9)$$

where $C_{\mathcal{R}} = \{x \in \mathbb{R}^N | \mathcal{R}(x) \leq \tau\}$ is a closed convex set and $\tau$ is uniquely defined by the regularisation parameter $\lambda$.

The data-fidelity functional $\mathcal{D}$, which measures the distance between $H(x)$ and the measurements y, is often expressed as the squared $\ell_2$-norm $$\mathcal{D}(x) = \tfrac{1}{2} \|H(x) - y\|_2^2. \qquad (10)$$

Different regularisation functionals $\mathcal{R}$, which are often called priors, are commonly used in the literature depending on the nature of the unknown image x. Some popular priors are the squared $\ell_2$-norm, $\ell_1$-norm, wavelet-sparsity or total variation (TV). Even though such priors have demonstrated their efficacy in standard image processing tasks, they remain far from optimal in the context of US imaging due to the highly specific nature of US images. Learned dictionaries combined with a suitable norm are also commonly used as regularisation functionals. However, they are computationally demanding and only applicable to patches of an image, clearly limiting the appeal of such techniques.

Figure 3:
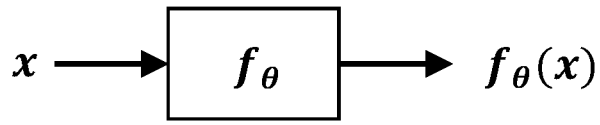
FIG. 3 is a block diagram illustrating a direct non-linear mapping according to an example of the present invention.

The present invention proposes a strategy which involves using a suitably trained non-linear mapping $f_\theta: \mathbb{R}^N \to \mathbb{R}^N$ with trainable parameters $\theta$ to construct a highly effective data-driven prior for the unknown image x. FIG. 3 shows a simplified block diagram of such a non-linear mapping $f_\theta$. The trained non-linear mapping can typically be a deep neural network (DNN) whose trainable parameters $\theta$ have been trained to reduce or even remove common US imaging artefacts.

Equipped with the trained non-linear mapping $f_\theta$, a data-driven prior can be expressed through a regularisation functional $\mathcal{R}$. A typical example of $\mathcal{R}$ may be defined as the inner product between the image x and the residual term $[x - f_\theta(x)]$ such that $$\mathcal{R}(x) = \tfrac{1}{2} x^T [x - f_\theta(x)], \qquad (11)$$

where $x^T$ represents the transpose of x. In the case of a complex vector $x \in C_{\mathcal{R}}^N$, the transpose operation should be replaced by the conjugate transpose (or Hermitian transpose) denoted $x^H$.

Another way of defining such a regularisation functional may be the squared $\ell_2$-norm of said residual, which is explicitly expressed as $$\mathcal{R}(x) = \tfrac{1}{2} \|x - f_\theta(x)\|_2^2. \qquad (12)$$

It is clear that in both examples given in Equations (11) and (12), $\mathcal{R}(x)$ will tend to zero as the image x tends to $f_\theta(x)$. In some scenarios, especially when considering DNNs, it may be desirable to design a non-linear mapping $f_\theta$ as a residual mapping such that $$f_\theta(x) = x + r_\theta(x), \qquad (13)$$

where $r_\theta: \mathbb{R}^N \to \mathbb{R}^N$ is a non-linear mapping trained to predict the negative noise to be applied to x.

Figure 4:
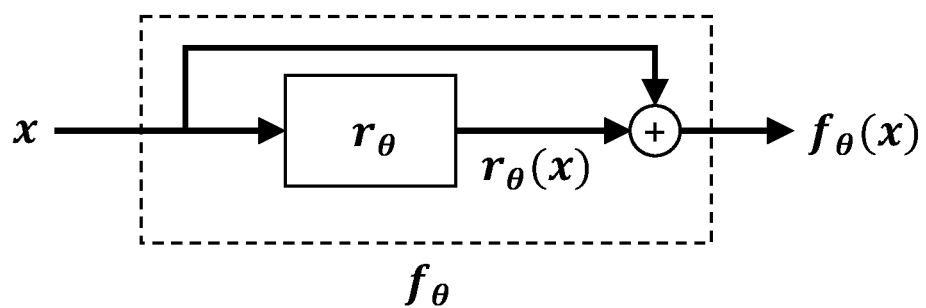
FIG. 4 is a block diagram illustrating a residual non-linear mapping according to an example of the present invention.

FIG. 4 shows a block diagram of such a residual non-linear mapping. In this case, the regularisation functional defined in Equation (12) can be simplified for example to become $$\mathcal{R}(x) = \tfrac{1}{2} \|r_\theta(x)\|_2^2. \qquad (14)$$

It is clear that, in this case, $\mathcal{R}(x)$ will tend to zero as the predicted negative noise $r_\theta(x)$ tends to zero.

Figure 5:
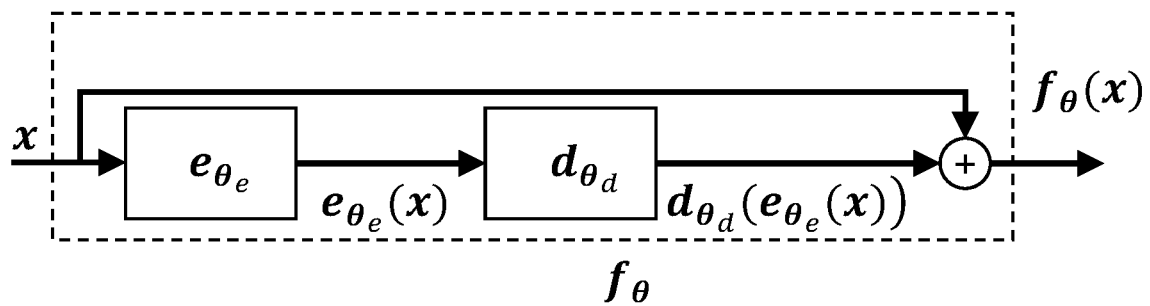
FIG. 5 is a block diagram illustrating a residual non-linear mapping having an "encoder-decoder" architecture according to an example of the present invention.

Another popular NN architecture is the "encoder-decoder" architecture, where an encoder $e_{\theta_e}$ with trainable parameters $\theta_e$ first maps the input image x to a latent space such that $e_{\theta_e}: \mathbb{R}^N \to \mathbb{R}^E$, where E represents the dimension of the latent space, which is usually smaller than the dimension of the image space N. The decoder $d_{\theta_d}$ with trainable parameters $\theta_d$ then maps the latent space back to the image space such that $d_{\theta_d}: \mathbb{R}^E \to \mathbb{R}^N$. In its residual form, such an architecture can be expressed as $$f_\theta(x) = x + r_\theta(x) = x + d_{\theta_d}(e_{\theta_e}(x)), \qquad (15)$$

where the trainable parameters $\theta$ include both $\theta_e$ and $\theta_d$. FIG. 5 shows a block diagram of a residual non-linear mapping with an "encoder-decoder" architecture. For such a trained non-linear mapping $f_\theta$, one may express the regularisation functional as $$\mathcal{R}(x) = \tfrac{1}{2} \|e_{\theta_e}(x)\|_2^2, \qquad (16)$$

which might be advantageous in terms of computational complexity.

Equipped with the data-driven regularisation functional $\mathcal{R}$ expressed in terms of a non-linear mapping $f_\theta$ appropriately trained for a given application, one can use it in a suitable image reconstruction method to produce high-quality images from a US imaging configuration only capable of producing low-quality images with a traditional image reconstruction method such as the well-known DAS. The proposed image reconstruction method typically requires solving and optimisation problem such as Problem (8) by means of an iterative algorithm. Many algorithms may be deployed for solving Problem (8) depending on the mathematical properties, such as convexity and differentiability, of both $\mathcal{D}$ and $\mathcal{R}$, some of which are described in the following sections. As far as the data fidelity functional is concerned, for the sake of brevity and clarity, but without restriction, we will limit the following examples to the data-fidelity functional expressed in terms of the squared $\ell_2$-norm as described in Equation (10).

Figure 6:
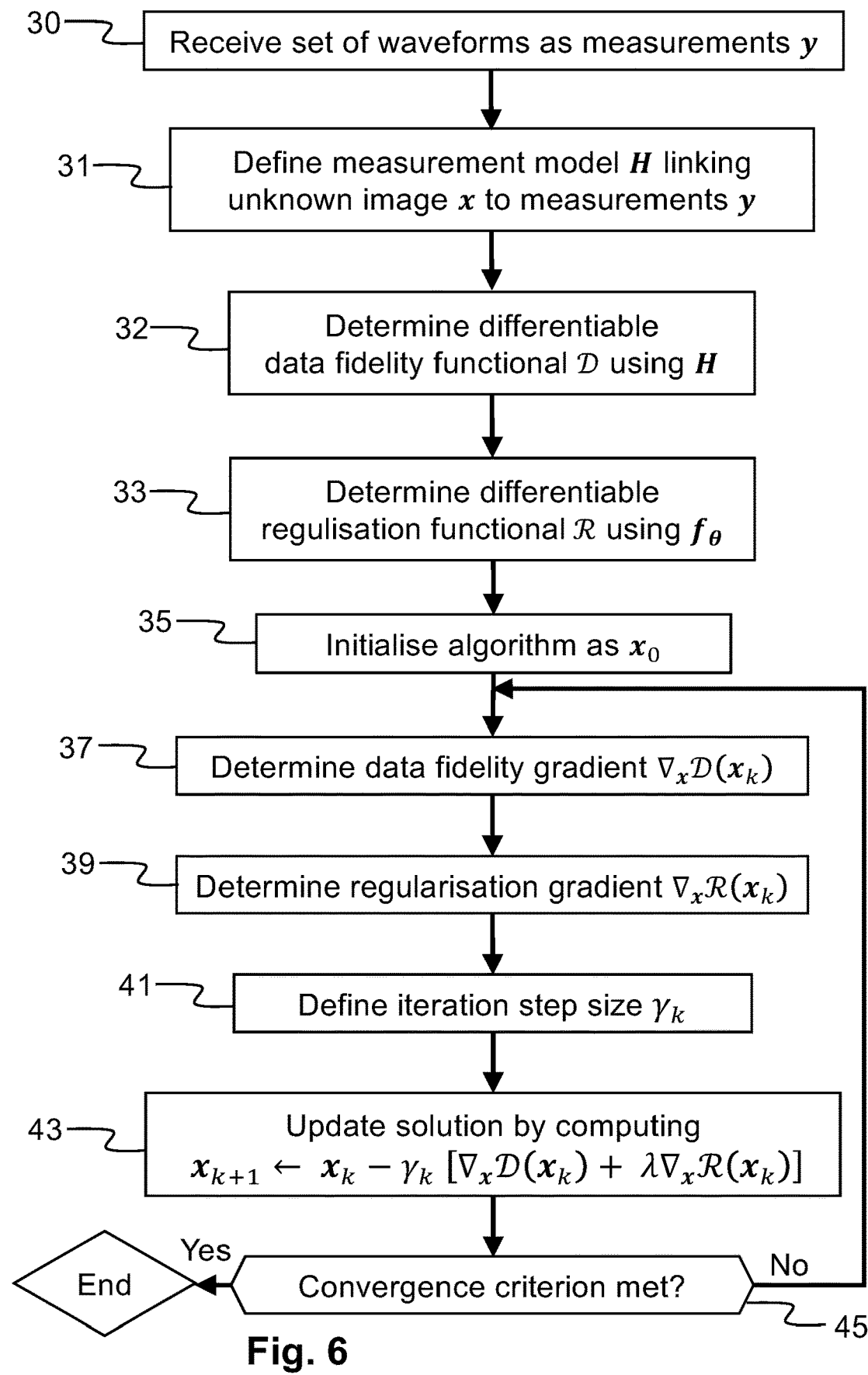
FIG. 6 is a flow chart illustrating the proposed image reconstruction method using a gradient descent algorithm according to an example of the present invention.

Let us first consider gradient descent methods. In this case we consider the problem of Equation (8), where one seeks to find $x \in \mathbb{R}^N$ that minimises the cost functional $\mathcal{F}(x) = \mathcal{D}(x) + \lambda \mathcal{R}(x)$. Assuming that $\mathcal{F}$ is differentiable with respect to x, which implies that both $\mathcal{D}$ and $\mathcal{R}$ are differentiable with respect to x, one can express the following gradient descent iteration $$x_{k+1} \leftarrow x_k - \gamma_k [\nabla_x \mathcal{D}(x_k) + \lambda \nabla_x \mathcal{R}(x_k)], k \geq 0, \quad (17)$$

where $\gamma_k \in \mathbb{R}$ is a step size that may vary at each iteration $k \in \mathbb{N}$ ($\mathbb{N}$ denoting natural numbers). With suitable initialisation $x_0$ and step size sequence $(\gamma_k)_{k \in \mathbb{N}}$, the sequence ($x_k)_{k \in \mathbb{N}}$ may converge to the desired local or even global minimum of the cost functional $\mathcal{F}$. The gradient descent algorithm consists in applying the iteration defined in Equation (17) recursively until a convergence criterion is met. The flow chart of FIG. 6 summarises the proposed image reconstruction process using the gradient descent algorithm. In step 30, the probe 3 receives or acquires a set of waveforms arising from the object of interest. In other words, in this step a set of waveforms (or signals) is received or acquired as measurements from the object of interest stimulated by (or exposed to) a physical excitation. In step 31, a measurement model is defined linking the unknown image of the medium to the recorded set of measurements. In step 32, a differentiable data-fidelity functional $\mathcal{D}$ is constructed using H. In step 33, a differentiable regularisation functional $\mathcal{R}$ is constructed using $f_\theta$. In step 35, the algorithm or solution is initialised as $x_0$. In step 37, the data fidelity gradient $\nabla_x \mathcal{D}(x_k)$ is evaluated or determined. In step 39, the regularisation gradient $\nabla_x \mathcal{R}(x_k)$ is evaluated or determined. In step 41, the iteration step size $\gamma_k$ is evaluated or determined. In step 43, the estimate or solution is updated by computing $x_{k+1} \leftarrow x_k - \gamma_k [\nabla_x \mathcal{D}(x_k) + \lambda \nabla_x \mathcal{R}(x_k)]$. In step 45, it is determined whether or not a given convergence criterion is met. In the affirmative, the process comes to an end. On the other hand, if the criterion has not been met, then the process continues in step 37.

Under strict assumptions about the cost functional $\mathcal{F}$, such as convexity and Lipschitz gradient, together with a suitable choice of the step size sequence $(\gamma_k)_{k \in \mathbb{N}}$, the convergence of the gradient descent algorithm can be guaranteed. These strict assumptions concerning $\mathcal{F}$ may be difficult to satisfy. In some situations, $\mathcal{D}$ and/or $\mathcal{R}$ may not be differentiable for any $x \in \mathbb{R}^N$. In such a case, one may replace the gradient $\nabla_x \mathcal{D}(x_k)$ (and/or $\nabla_x \mathcal{R}(x_k)$) in Equation (17) by its sub-gradient $s_\mathcal{D}(x_k) \in \partial_x \mathcal{D}(x_k)$ (and/or $s_\mathcal{R}(x_k) \in \partial \mathcal{R}(x_k)$) if $\mathcal{D}$ (and/or $\mathcal{R}$) is a convex non-differentiable functional. If $\mathcal{D}$ (and/or $\mathcal{R}$) is a non-convex non-differentiable functional with local Lipschitz continuity, one may replace the gradient $\nabla_x \mathcal{D}(x_k)$ (and/or $\nabla_x \mathcal{R}(x_k)$) in Equation (17) by its generalised gradient $g_\mathcal{D}(x_k) \in \overline{\partial}_x \mathcal{D}(x_k)$ (and/or $g_\mathcal{R}(x_k) \in \overline{\partial}_x \mathcal{R}(x_k)$) as defined by Clarke F., (2013) Generalized gradients, "Functional Analysis, Calculus of Variations and Optimal Control", Graduate Texts in Mathematics, vol. 264. Springer, London.

It is common to construct the data-fidelity functional as a well-behaved, convex and Lipschitz gradient functional, using a linear measurement model, but such properties may not be easily verified when constructing a regularisation functional $\mathcal{R}$ with a trained non-linear mapping $f_\theta$, such as a NN. In this case, one may enforce the differentiability of $f_\theta$ by exclusively using differentiable activation functions. If non-differentiable activation functions, such as the popular rectified linear unit (ReLU), are used and local Lipschitz continuity can be enforced, one can benefit from the generalized gradient defined above. If local Lipschitz continuity cannot be enforced, one may still approximate the gradient $\nabla_x \mathcal{R}(x_k)$ at discontinuous positions as it is commonly done for the training of such NNs. Having a well-guessed initialisation $x_0$ may also be particularly advantageous. For instance, using the image obtained by the well-known DAS can provide an efficient initialisation $x_0$ to the iteration defined in Equation (17). Many variants of the gradient descent algorithm have been developed in order to either accelerate its pace or relax the assumptions concerning $\mathcal{F}$ for given convergence guarantees. Such variants may of course be readily applied.

The gradient descent iteration described in Equation (17) involves the gradients of both $\mathcal{D}$ and $\mathcal{R}$. As an example, we consider the squared $\ell_2$-norm data fidelity defined in Equation (10) for which the gradient can be expressed as $$\nabla_x \mathcal{D}(x_k) = \nabla_x H(x)[H(x)-y]. \quad (18)$$

It can be noted that $\nabla_x H(x)$ is the transpose of the Jacobian matrix defined as $$J_H(x) = \left[ \frac{\partial H(x)}{\partial x_1} \frac{\partial H(x)}{\partial x_2} \cdots \frac{\partial H(x)}{\partial x_N} \right] \in \mathbb{R}^{M \times N}. \quad (19)$$

In the linear case, the gradient of the squared $l_2$-norm data fidelity functional $\mathcal{D}$ becomes $$\nabla_x \mathcal{D}(x_k) = H^T [Hx - y]. \quad (20)$$

The gradient of the regularisation functional $\mathcal{R}$ is of particular interest. Let us consider for example the regularisation functional $\mathcal{R}$ defined in Equation (11). Its gradient $\nabla_x \mathcal{R}$ can be expressed as $$\nabla_x \mathcal{R}(x) = x - \frac{1}{2}[f_\theta(x) + \nabla_x f_\theta(x)x], \quad (21)$$

where $\nabla_x f_\theta(x)x$ is the directional derivative of the trained non-linear mapping $f_\theta$ at position x along the direction x, where $\nabla_x f_\theta(x)$ is the transpose of the Jacobian matrix defined as $$J_{f_\theta}(x) = \left[ \frac{\partial f_\theta(x)}{\partial x_1} \frac{\partial f_\theta(x)}{\partial x_2} \cdots \frac{\partial f_\theta(x)}{\partial x_N} \right] \in \mathbb{R}^{N \times N}. \quad (22)$$

However, building the Jacobian matrix $J_{f_\theta}(x_k)$ at each iteration k would be computationally prohibitive. One can see that only the evaluation of the term $\nabla_x f_\theta(x_k)x_k$ is required at each iteration as described in Equation (17). Provided that this evaluation is possible without having to build the Jacobian matrix, the iteration could be efficiently handled. One remarkable aspect of using a NN as $f_\theta$ lies in the fact that it is differentiable in essence, or that at least means for efficiently approximating its gradient are readily available. This differentiability is a key building block of its training strategy which relies on the powerful backpropagation approach, which relies on the chain rule. Hence, one can take advantage of computationally efficient backpropagation algorithms to directly evaluate the matrix-vector product $\nabla_x f_\theta(x_k)x_k$ without having to explicitly build the Jacobian matrix $J_{f_\theta}(x_k)$. This strategy can be viewed as a "matrix-free" evaluation of the directional derivative and is a clear advantage when using a NN for the trained non-linear mapping $f_\theta$.

As a second example, let us consider the regularisation functional $\mathcal{R}$ defined in Equation (14). Its gradient can be expressed as $$\nabla_x \mathcal{R}(x) = \nabla_x r_\theta(x) r_\theta(x), \quad (23)$$

where $\nabla_x r_\theta(x) r_\theta(x)$ is the directional derivative of the trained non-linear residual mapping $r_\theta$ at position x along the direction $r_\theta(x)$. Similarly to the previous example, one can evaluate the matrix-vector product $\nabla_x r_\theta(x_k) r_\theta(x_k)$ at each iteration k by taking advantage of efficient backpropagation algorithms.

Projection-based methods are considered next. Let us first introduce the proximal gradient methods, which may be used to solve the problem of Equation (8) when both $\mathcal{D}$ and $\mathcal{R}$ are convex functionals, $\mathcal{D}$ is differentiable and $\mathcal{R}$ is non-differentiable. The iteration of the corresponding algorithm is given by $$x_{k+1} \leftarrow \text{pro} x_{\lambda\mathcal{R}}(x_k - \gamma_k \nabla_x \mathcal{D}(x_k)), k \geq 0 \qquad (24)$$

where $\gamma_k \in \mathbb{R}$ is the gradient step size at iteration $k \in \mathbb{N}$. Equation (24) first performs a gradient step with respect to the data fidelity ensuring closeness to the measurements and then a proximal step, which accounts for the prior knowledge about the unknown image. The proximal operator involved in Equation (24) is defined as $$prox_{\mu\mathcal{R}}(z) = \operatorname*{argmin}_{x \in \mathbb{R}^N} \{\|x - z\|_2^2 + \mu \mathcal{R}(x)\}, \qquad (25)$$

for some $\mu \in \mathbb{R}^+$ and where $z \in \mathbb{R}^N$ refers to an intermediate image. Depending on the trained non-linear mapping $f_\theta$ used in the construction of the regularisation functional $\mathcal{R}$, Problem (25) may have a closed-form solution in which case it can be readily applied. If such a closed-form solution is not available, one could solve Equation (25) iteratively which might however be computationally demanding.

Looking more closely at the proximal operator defined in Equation (25) and involved in Equation (24), it can be noted that this operation is conceptually a denoising of the image x. Taking advantage of the plug-and-play prior approach as explained for example by S. V. Venkatakrishnan, Ch. A. Bouman and Br. Wohlberg, "Plug-and-Play priors for model based reconstruction", in 2013 IEEE Global Conference on Signal and Information Processing, 2013, pp. 945-94, one can replace the proximal operator by a suitable denoiser. Hence, replacing the proximal operator by a trained non-linear mapping $f_\theta$ can provide significant improvements in the resulting image quality. The iteration defined in Equation (24) becomes $$x_{k+1} \leftarrow f_\theta(x_k - \gamma_k \nabla_x \mathcal{D}(x_k)), k \geq 0. \qquad (26)$$

Figure 7:
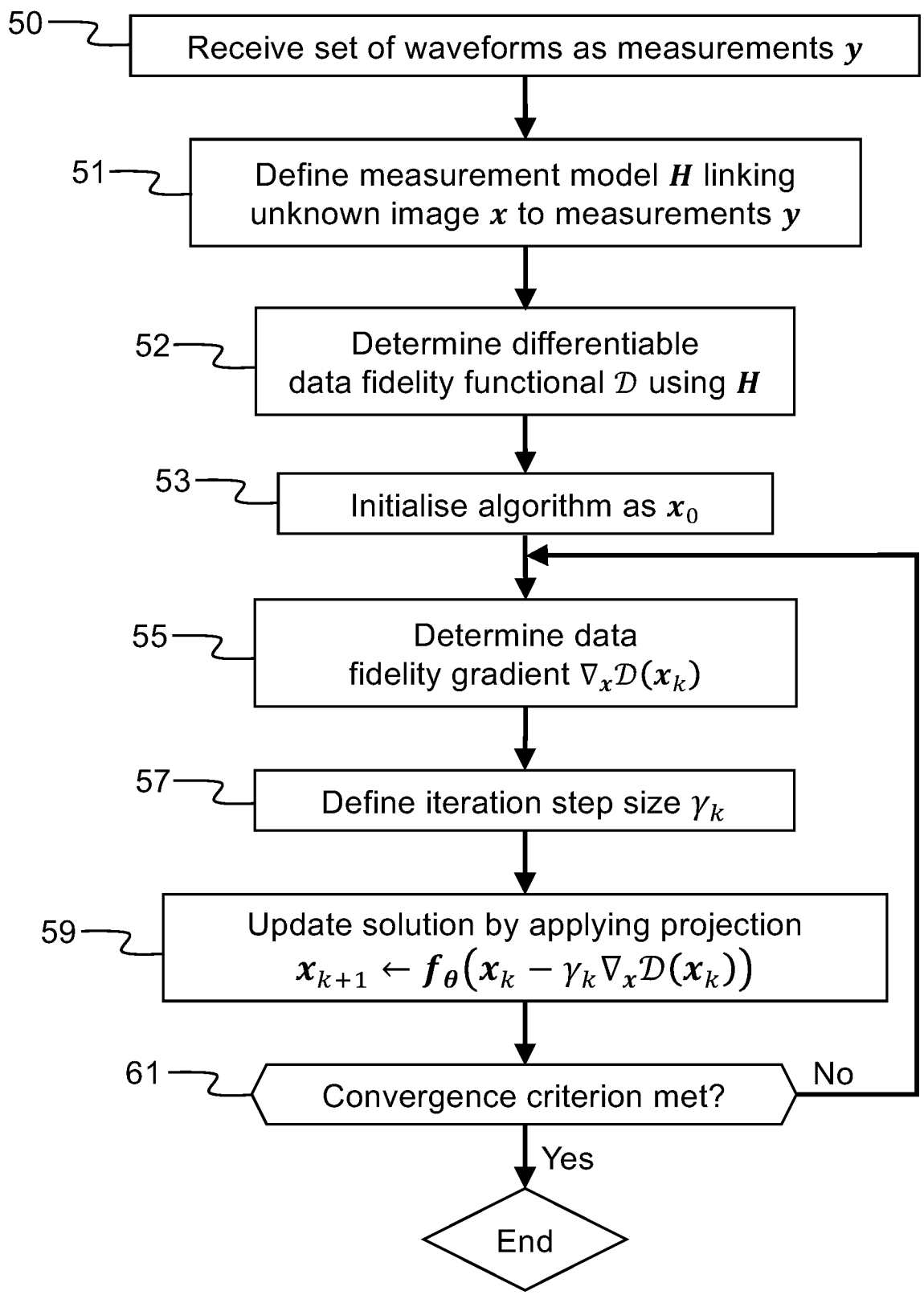
FIG. 7 is a flow chart illustrating the proposed image reconstruction method using a generic projection-based algorithm according to an example of the present invention.

It can be noted that in the special case where $f_\theta$ is a projector onto some closed convex set $C_\mathcal{R}$, the iteration described in Equation (26) corresponds to the well-known projected gradient descent algorithm and can be used to solve the constrained optimisation problem defined in Equation (9). Hence, the iteration defined in Equation (26) may be used to form a generic projection-based algorithm, which reduces to the projected gradient descent algorithm when $f_\theta$ is a projector onto some closed convex set $C_\mathcal{R}$. The generic projection-based algorithm consists in applying the iteration defined in Equation (26) recursively until a convergence criterion is met. The flow chart of FIG. 7 shows a proposed image reconstruction process using a generic projection-based algorithm. In step 50, the probe 3 receives or acquires a set of waveforms arising from the object of interest. In other words, in this step a set of waveforms (or signals) is received or acquired as measurements from the object of interest stimulated by (or exposed to) a physical excitation. In step 51, the measurement model is defined linking the unknown image of the medium to the recorded set of measurements. In step 52, is a differentiable or sub-differentiable data-fidelity functional $\mathcal{D}$ is constructed or defined using H. In step 53, the algorithm or solution is initialised as $x_0$. In step 55, the data fidelity gradient $\nabla_x \mathcal{D}(x_k)$ is evaluated or determined. In step 57, the iteration step size $\gamma_k$ is evaluated or determined. In step 59, the estimate or solution is updated by applying the projection $x_{k+1} \leftarrow f_\theta(x_k - \gamma_k \nabla_x \mathcal{D}(x_k))$. In step 61, it is determined whether or not a given convergence criterion is met. In the affirmative, the process comes to an end. On the other hand, if the criterion has not been met, then the process continues in step 55. When the trained non-linear mapping $f_\theta$ is a general mapping it is similar to the plug-and-play approach. When the trained non-linear mapping $f_\theta$ is a projector onto some closed convex set, the projection-based algorithm is equivalent to the well-known projected gradient descent algorithm.

A special case of interest arises when considering a single iteration k=0 of Equation (26) with step size $\gamma_0=1$ and initialisation $x_0=0$. Assuming a linear measurement case with a squared $\ell_2$-norm data fidelity functional $\mathcal{D}$ as defined in Equation (10), for which the gradient is expressed in Equation (20), the estimate $\hat{x}$ is given by $$\hat{x} = f_\theta(x_0 - \gamma_0 H^T[Hx_0 - y]) \qquad (27)$$

$$= f_\theta(H^T y). \qquad (28)$$

It has been proved that the operation $H^T y$ is in fact the well-known DAS operation applied to the measurements y when specific assumptions are made concerning the linear measurement operator H. Hence, in this very specific case, a high-quality image estimate $\hat{x}$ can be obtained from a low-quality image estimate $\tilde{x}$ reconstructed by DAS such that $\tilde{x} = H^T y$ by a simple direct mapping $$\hat{x} = f_\theta(\tilde{x}). \qquad (29)$$

Thus, the low-quality image estimate $\tilde{x} = H^T y$ is first computed and then the estimate is computed by applying the mapping, such that $\hat{x} = f_\theta(\tilde{x})$.

Such a simplification has the great advantage of only requiring the reconstruction of a low-quality image by means of DAS followed by a single evaluation of $f_\theta$. Hence, the trained non-linear mapping $f_\theta$ is approximating the inverse of the mapping F defined in Equation (3). Even though simplistic, this special case may already provide significant improvements on the reconstructed high-quality image $\hat{x}$, which is significantly enhanced compared to the low-quality image $\tilde{x}$.

It can be noted that both image reconstruction examples presented above (gradient descent and projection-based methods) rely at each iteration of an iterative algorithm on a globally trained non-linear mapping $f_\theta$. However, one can readily specialise this approach with a set of non-linear mappings $$\{f_{\theta_k}\}_{k \in \mathbb{N}}$$

in which each $f_{\theta_k}$ is specifically designed and trained for the given level of artefacts present at each iteration $k \in \mathbb{N}$ of an iterative algorithm. In this case the image reconstruction method would be based on at least two trained non-linear mappings (a multiplicity of trained non-linear mappings).

Above it was described a general method for solving an optimisation problem, such as the one described in Equation (8), where the regularisation functional $\mathcal{R}$ is constructed using a trained non-linear mapping $f_\theta$. In the following, some insights are provided on how to design and train such a non-linear mapping in order to fully benefit from the proposed approach.

Figure 8:
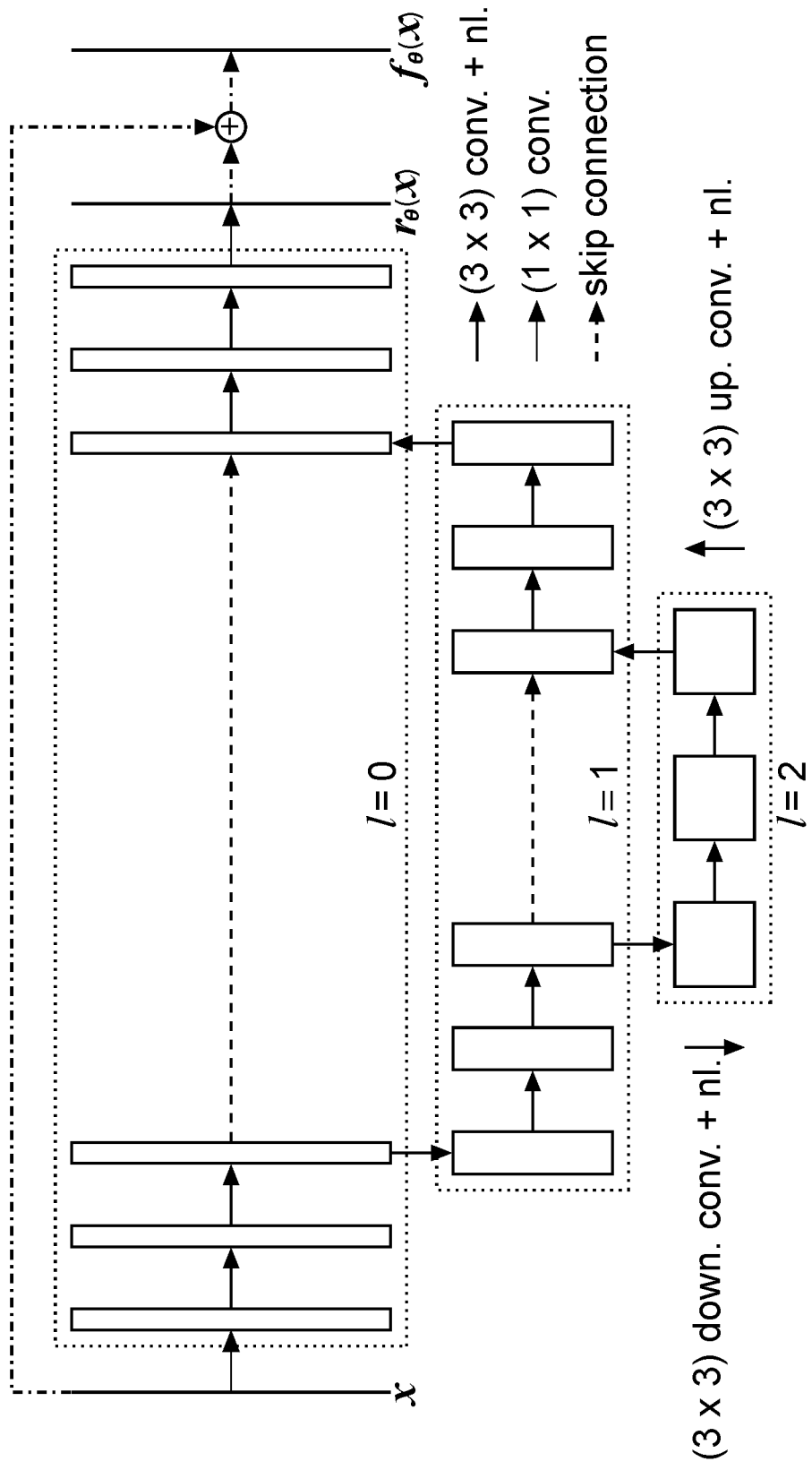
FIG. 8 is a block diagram illustrating an example deep residual convolutional neural network, which may be used in the present invention.

As a non-limiting example, the residual "encoder-decoder" architecture shown in FIG. 5 is considered. Such an architecture may be implemented as a deep residual convolutional NN, such as the one presented in FIG. 8. The encoding of an input image x is performed through the downward path of the NN architecture (from top-left to bottom-centre) and the decoding is performed in the upward path of the NN architecture (from bottom-centre to top-right) up to the intermediate residual output $r_\theta(x)$. The residual output is then summed to the input image to form the final output $f_\theta(x)=x+r_\theta(x)$. The solid arrows specify operations, while the dashed arrows specify intrinsic skip connections. The dashed-dotted arrows do not represent an operation but represent a transfer of quantity. Each of the dotted boxes frames a decomposition level. In this specific example, three decomposition levels are considered, namely l=0, 1, 2. The rectangles with solid outlines represent feature maps, i.e. the output of an operation or layer, at the respective depths of the NN. The width (i.e. the dimension along a horizontal line) of each box indicates the channel number present in the feature map. The first operation expands the channel number of the input image x to a user-definable channel number $N_c$ using a convolutional operation with a kernel size of (1×1). The last operation before the residual output $r_\theta(x)$ performs a contraction of the channel number $N_c$ back to the channel number of the input image using a convolutional operation with kernel size of (1×1). Within each decomposition level, a (3×3) convolutional operation followed by a non-linear activation (nl. in FIG. 8) is performed between each feature map without changing the dimension of the feature map. Such a non-linear activation may for example be the well-known rectified linear unit (ReLU), the exponential linear unit (ELU) or the sigmoid function. Between each decomposition level in the downward path, a downsampling operation is performed using a multiscale (3×3) convolutional operation with (or without) an expansion of the number of channels, followed by a non-linear activation. Such a multiscale operation may for example be the combination of a max pooling operation followed by a convolution operation. It may also be a strided convolution with (or without) an expansion of the number of channels. Between each decomposition level in the upward path, an upsampling operation is performed using a multiscale (3×3) convolutional operation followed by a non-linear activation. Such a multiscale operation may for example be a transposed and strided convolution operation with (or without) a contraction of the number of channels.

All the filter coefficients of the NN architecture are trainable parameters. These parameters, also called weights, may be trained by minimising the empirical risk $$\hat{\theta} = \underset{\theta}{\operatorname{argmin}} \frac{1}{L} \sum_{j=1}^{L} \mathcal{L}(f_\theta(\tilde{x}_j), \hat{x}_j), \quad (30)$$

where L is a training loss function, $\{\hat{x}_j\}_{j=1}^L$ and $\{\tilde{x}_j\}_{j=1}^L$ are sets of L images. It is common to construct the sets $\{\hat{x}_j\}_{j=1}^L$ and $\{\tilde{x}_j\}_{j=1}^L$ by respectively sampling from a high-quality subspace V and a low-quality subspace W. Such samples may for example be acquired experimentally or by numerical simulation. The set $\{\hat{x}_j, \tilde{x}_j\}_{j=1}^L$ is often referred to as a training set. Optimisation algorithms, such as stochastic gradient descend (SGD), batch SGD or Adam optimizer (D.

P. Kingma and J. Ba, "Adam: A Method for Stochastic Optimization", pp. 1-15, 2014. arXiv: 1412.6980), which is an SGD variant using momentum evaluated from previous iterations, may for instance be used for solving the minimisation problem defined in Equation (30). To this end, the gradient of the loss function with respect to the trainable parameters $\nabla_\theta \mathcal{L}$ may for example be computed by backpropagation using the popular chain rule. A typical loss function is the mean squared error (MSE) defined as $$\mathcal{L}(f_\theta(\tilde{x}_j), \hat{x}_j) = \frac{1}{2} \|\hat{x}_j - f_\theta(\tilde{x}_j)\|_2^2. \quad (31)$$

However, different loss function, risk minimisation function and optimisation algorithm may be used.

For the non-linear mapping $f_\theta$, a neural network architecture called U-Net may be used (among other possibilities) which was first introduced by O. Ronneberger, Ph. Fischer, and Th. Brox, "U-Net: Convolutional Networks for Biomedical Image Segmentation", pp. 1-8, 2015. arXiv: 1505.04597 for biomedical image segmentation purpose and recently adapted in the context of sparse-view CT image reconstruction. It is in essence very similar to the residual non-linear mapping presented in FIG. 8. The parameters θ of $f_\theta$ are optimised using the Adam optimiser while the MSE, which was described earlier, is used as a training loss.

The training set may be composed of approximatively 1000 to 100 000 or 10 000 to 30 000 images generated using a specific simulator for example. Synthetic phantoms may be used for this purpose and may be randomly generated with inclusions of variable size and echogenicity. The probability distributions for inclusion size and echogenicity may be modelled to closely mimic the distribution present in the object of interest. Numerical phantoms may be designed and used to obtain a fully diffusive speckle pattern throughout the entire image with an echogenicity ranging from −∞ dB (anechoic regions) to 30 dB (hyperechoic regions). The main advantages of using simulated data rather than experimental data are as follows. It provides full control over the distribution of artefacts and inclusions of different echogenicity. This is useful for training a neural network because, if a specific artefact is only scarcely represented in the training set, the neural network will put very little focus in removing it. It is also possible to impose a wider diversity in the training set than what would be possible with experimental data. The fact that the simulation environment is entirely controlled also prevents blurring effects induced by tissue motion. Another advantage is the possibility to simulate non-existing US imaging configurations. For example, the LQ configuration defined in Table 1 is based on a realistic probe, but the probe used in the HQ configuration does not exist and allows the reconstruction of ideal images for the given aperture. The main disadvantage of using simulated training set is that it is not self-evident whether or not the results will translate when applied to experimental data.

Once trained, the direct mapping approach given in Equation (29) may for instance be used. A high-quality image estimate $\hat{x}$ can thus be obtained by simply applying the trained non-linear mapping $f_\theta$ to a low-quality image estimate $\tilde{x}$.

To summarise, the present invention is motivated by the fact that reconstructing images from a high-quality US imaging configuration, in an ultrafast US imaging context, comes at a price and might not even be feasible in practice. Indeed, high-quality ultrafast images are generally obtained by averaging or compounding multiple images of lower quality reconstructed sequentially. An example of this strategy is the well-known coherent PW compounding where steered PWs are transmitted sequentially and the final image is obtained by averaging all images reconstructed for each steered PW. Since transmit-receive events are sequential, the round-trip time-of-flight of the acoustic wave can already be a limiting factor in scenarios where very high frame rates are required. The computational requirements for reconstructing many images to be compounded may also not be viable in some situations such as in 3D imaging or low-power environments. Moreover, the motion of the object (e.g. a human tissue) can induce a substantial blurring of the resulting image when averaging sequential images reconstructed at different time instants. Thus, one of the goals of the present invention is to reconstruct high-quality images with a single or very few PW measurements.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. For example, the teachings of the present invention can be applied to photoacoustic imaging, where the transmitted acoustic waves are replaced with electromagnetic-radiation pulses.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. An image reconstruction method comprising:
receiving a set of waveforms as measurements y from an object of interest;
defining a measurement model H linking an unknown image x of the object to the measurements y;
determining a data fidelity functional $\mathcal{D}$ using the measurement model, the data fidelity functional measuring a distance between H(x) and the measurements y;
determining a regularisation functional $\mathcal{R}$ using a trained non-linear mapping $f_\theta$, the mapping being non-linear with respect to its input data, the regularisation functional comprising prior knowledge about the unknown image;
defining an optimisation problem involving the data fidelity functional and the regularisation functional for obtaining a first image estimate $\hat{x}$ of the unknown image; and
solving the optimisation problem to obtain the first image estimate $\hat{x}$.

2. The method according to claim 1, wherein the method comprises, prior to defining the data fidelity functional $\mathcal{D}$ and the regularisation functional $\mathcal{R}$, training the non-linear mapping by using a training data set.

3. The method according to claim 2, wherein the training data set comprises images acquired experimentally or by numerical simulation.

4. The method according to claim 1, wherein the trained non-linear mapping is a trained artificial neural network.

5. The method according to claim 1, wherein the optimisation problem is expressed as $$\hat{x} = \underset{x \in \mathbb{R}^N}{\mathrm{argmin}}\{\mathcal{D}(x) + \lambda \mathcal{R}(x)\},$$

where $\lambda \in \mathbb{R}^+$ is a regularisation parameter controlling the weighting of the regularisation functional $\mathcal{R}$.

6. The method according to claim 1, wherein the data fidelity functional $\mathcal{D}$ and/or the regularisation functional $\mathcal{R}$ has at least one of the following properties: convexity, non-convexity, differentiability and non-differentiability.

7. The method according to claim 1, wherein solving the optimisation problem comprises executing an iterative algorithm.

8. The method according to claim 7, wherein the iterative algorithm used for solving the optimisation problem is a gradient descent method or a generic projection-based method.

9. The method according to claim 7, wherein the method comprises setting an iteration step size to one, setting an initialisation parameter to zero and including only one iteration in the iterative algorithm and then applying the non-linear mapping directly to a second image estimate $\tilde{x}$ for obtaining the first image estimate $\hat{x}$ of the object of interest, wherein the second image estimate $\tilde{x}$ has a lower quality in terms of image artefacts than the first image estimate $\hat{x}$.

10. The method according to claim 7, wherein the trained non-linear mapping varies from one iteration step to another.

11. The method according to claim 7, wherein the method further comprises transmitting a set of waveforms to an object of interest.

12. The method according to claim 11, wherein the number of transmitted waveforms is between one and five, and more specifically between one and three, and more specifically one.

13. The method according to claim 1, wherein the image reconstruction method is an ultrasound image reconstruction method.

14. The method according to claim 1, wherein the regularisation functional is defined as one of the following: $\mathcal{R}(x)=\frac{1}{2}x^T[x-f_\theta(x)]$; $\mathcal{R}(x)=\frac{1}{2}\|x-f_\theta(x)\|_2^2$; $\mathcal{R}(x)=\frac{1}{2}\|r_\theta(x)\|_2^2$, where $r_\theta: \mathbb{R}^N \rightarrow \mathbb{R}^N$ is a non-linear mapping trained to predict the negative noise to be applied to x; and $\mathcal{R}(x)=\frac{1}{2}\|e_{\theta_e}(x)\|_2^2$, where $e_{\theta_e}$ is an encoder with trainable parameters $\theta_e$.

15. An image reconstruction apparatus being configured to perform operations comprising:
receive a set of waveforms as measurements y from an object of interest;
define a measurement model H linking an unknown image x of the object to the measurements;
determine a data fidelity functional $\mathcal{D}$ using the measurement model, the data-fidelity functional measuring a distance between H(x) and y;
determine a regularisation functional $\mathcal{R}$ using a trained non-linear mapping, the mapping being non-linear with respect to its input data, the regularisation functional comprising prior knowledge about the unknown image;
define an optimisation problem involving the data fidelity functional and the regularisation functional for obtaining a first image estimate $\hat{x}$ of the unknown image; and
solve the optimisation problem to obtain the first image estimate $\hat{x}$.

* * * * *